US012300065B2

(12) United States Patent
Kotab

(10) Patent No.: US 12,300,065 B2
(45) **Date of Patent: *May 13, 2025**

(54) SYSTEMS AND METHODS OF READING PLAYING CARDS AND OTHER STACKED ITEMS

(71) Applicant: Walker Digital Table Systems, LLC, Las Vegas, NV (US)

(72) Inventor: Dominic M. Kotab, San Jose, CA (US)

(73) Assignee: Walker Digital Table Systems, LLC, Las Vegas, NV (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/209,442

(22) Filed: Jun. 13, 2023

(65) Prior Publication Data

US 2023/0326293 A1 Oct. 12, 2023

Related U.S. Application Data

(63) Continuation of application No. 17/974,404, filed on Oct. 26, 2022, now abandoned, which is a continuation of application No. 16/886,373, filed on May 28, 2020, now abandoned, which is a continuation of application No. 16/670,980, filed on Oct. 31, 2019, now Pat. No. 10,706,681, which is a continuation of application No. 16/286,415, filed on Feb. 26, 2019, now Pat. No. 10,510,208, which is a continuation of application No. 15/353,648, filed on Nov. 16, 2016, now abandoned, which is a continuation of application No. 13/069,278, filed on Mar. 22, 2011, now Pat. No. 9,508,213.

(Continued)

(51) Int. Cl.
*G07F 17/32* (2006.01)

(52) U.S. Cl.
CPC .......... *G07F 17/3248* (2013.01); *G07F 17/32* (2013.01); *G07F 17/3202* (2013.01); *G07F 17/322* (2013.01); *G07F 17/3225* (2013.01); *G07F 17/3241* (2013.01)

(58) Field of Classification Search
CPC .......................... G07F 17/3248; G07F 17/322
See application file for complete search history.

(56) References Cited

U.S. PATENT DOCUMENTS

| | | | |
|---|---|---|---|
| 3,967,161 | A | 6/1976 | Lichtblau |
| 5,519,381 | A | 5/1996 | Marsh et al. |

(Continued)

FOREIGN PATENT DOCUMENTS

| | | | |
|---|---|---|---|
| CA | 2543221 | | 9/2015 |
| CN | 102039048 | A | 5/2011 |

(Continued)

OTHER PUBLICATIONS

Written Opinion for Application No. PCT/US2016/032797 dated Aug. 30, 2016; 12 pps.

(Continued)

*Primary Examiner* — Nabil H Syed
(74) *Attorney, Agent, or Firm* — RowanTree Law Group, PLLC; Magdalena M. Fincham

(57) ABSTRACT

Systems, methods and computer program products associated with wirelessly (e.g., RF) readable playing cards and/or gaming chips are disclosed.

21 Claims, 7 Drawing Sheets

Related U.S. Application Data

(60) Provisional application No. 61/316,308, filed on Mar. 22, 2010.

(56) References Cited

U.S. PATENT DOCUMENTS 5,521,601 A 5/1996 Kandlur et al.
5,735,742 A * 4/1998 French .................. G07F 7/0866 273/138.2
5,822,714 A 10/1998 Cato
5,963,134 A 10/1999 Bowers et al.
5,963,144 A 10/1999 Kruest
6,034,603 A 3/2000 Steeves
6,147,606 A 11/2000 Duan
6,243,012 B1 6/2001 Shober et al.
6,271,793 B1 8/2001 Brady et al.
6,281,794 B1 8/2001 Duan et al.
6,283,856 B1 9/2001 Mothwurf
6,329,915 B1 12/2001 Brady et al.
6,377,203 B1 4/2002 Doany
6,400,274 B1 6/2002 Duan et al.
6,424,263 B1 7/2002 Lee et al.
6,466,131 B1 10/2002 Tuttle et al.
6,517,435 B2 2/2003 Soltys et al.
6,533,662 B2 3/2003 Soltys et al.
6,579,180 B2 6/2003 Soltys et al.
6,581,747 B1 6/2003 Charlier et al.
6,741,178 B1 5/2004 Tuttle
6,745,008 B1 6/2004 Carrender et al.
6,754,368 B1 6/2004 Cohen
6,838,989 B1 1/2005 May et al.
6,891,466 B2 5/2005 Turner et al.
6,940,466 B2 9/2005 Terry
6,970,089 B2 11/2005 Carrender
6,995,655 B2 2/2006 Ertin et al.
7,286,043 B2 10/2007 Carrender et al.
7,683,789 B2 3/2010 Stewart et al.
7,714,726 B2 5/2010 Stewart et al.
7,719,424 B2 5/2010 Steil
7,762,887 B1 7/2010 House et al.
7,822,641 B2 10/2010 Abbott et al.
7,938,722 B2 5/2011 Rowe et al.
7,982,617 B2 7/2011 Koyama et al.
8,016,665 B2 9/2011 Gururajan et al.
8,092,293 B2 1/2012 Richards et al.
8,277,310 B2 10/2012 Koyama
8,449,370 B2 5/2013 Koyama et al.
8,480,484 B2 7/2013 Steil
8,540,579 B2 9/2013 Richard et al.
8,576,078 B2 11/2013 Stewart
8,608,548 B2 12/2013 Mattice et al.
9,378,605 B2 6/2016 Koyama
9,477,918 B2 10/2016 Stewart
9,508,213 B2 11/2016 Kotab
9,514,597 B2 12/2016 Schwartz
9,520,025 B2 12/2016 Koyama et al.
9,858,756 B2 1/2018 Gelinotte et al.
10,706,681 B2 7/2020 Kotab
10,750,552 B2 8/2020 Witkowski et al.
10,755,520 B2 8/2020 Moore et al.
11,126,908 B2 9/2021 Sterwart
11,288,917 B2 3/2022 Moore et al.
2003/0006121 A1 1/2003 Lee et al.
2003/0180451 A1 9/2003 Kodas et al.
2003/0195025 A1 10/2003 Hill
2004/0201457 A1 10/2004 O'Toole et al.
2004/0203185 A1 10/2004 Kerr et al.
2004/0207156 A1 * 10/2004 Soltys ................. G07F 17/3293 273/292
2005/0022114 A1 1/2005 Shanahan et al.
2005/0052283 A1 3/2005 Collins et al.
2005/0054408 A1 3/2005 Steil et al.
2005/0065861 A1 3/2005 Bann
2005/0104956 A1 5/2005 Ono et al.
2005/0110210 A1 5/2005 Soltys et al.
2005/0119048 A1 † 6/2005 Soltys
2005/0121852 A1 6/2005 Soltys et al.
2006/0001211 A1 1/2006 Lewis et al.
2006/0019739 A1 1/2006 Soltys et al.
2006/0115797 A1 6/2006 Gray
2006/0139034 A1 6/2006 Nevermann
2006/0160600 A1 7/2006 Hill
2006/0160608 A1 7/2006 Hill
2006/0208066 A1 9/2006 Finn et al.
2006/0208958 A1 9/2006 Stewart
2006/0217185 A1 9/2006 Cabagna
2006/0250251 A1 11/2006 Stewart
2006/0287068 A1 12/2006 Walker et al.
2007/0035399 A1 2/2007 Hecht et al.
2007/0057469 A1 3/2007 Grauzer
2007/0060307 A1 3/2007 Mathis et al.
2007/0060311 A1 3/2007 Rowe
2007/0060313 A1 3/2007 Mathis et al.
2007/0075834 A1 4/2007 Armstrong et al.
2007/0094721 A1 * 4/2007 Nguyen .................... G07F 1/06 726/9
2007/0117623 A1 5/2007 Nelson et al.
2007/0184898 A1 8/2007 Miller et al.
2007/0205953 A1 9/2007 Bombay et al.
2007/0225055 A1 9/2007 Weisman
2007/0293303 A1 12/2007 Shayesteh
2008/0009339 A1 1/2008 Butrico et al.
2008/0074271 A1 3/2008 Hodges
2008/0076529 A1 3/2008 Richards
2008/0113767 A1 5/2008 Nguyen
2008/0113771 A1 5/2008 Baerlocher et al.
2009/0054130 A1 2/2009 Gelinotte et al.
2009/0075723 A1 3/2009 Richard et al.
2009/0131151 A1 5/2009 Harris
2009/0170595 A1 7/2009 Walker
2009/0201131 A1 8/2009 Delia et al.
2009/0233699 A1 9/2009 Koyama
2009/0291762 A1 11/2009 Walker
2010/0001862 A1 1/2010 Wilson et al.
2010/0093429 A1 4/2010 Mattice
2010/0160032 A1 6/2010 Paton
2010/0182130 A1 7/2010 Sterwart
2010/0240446 A1 9/2010 Koyama et al.
2011/0027703 A1 2/2011 Shoki
2011/0057846 A1 3/2011 Scattergood
2011/0089634 A1 4/2011 Thorson
2011/0204565 A1 8/2011 Gelinotte et al.
2011/0227703 A1 9/2011 Kotab
2012/0038445 A1 2/2012 Finn
2012/0169468 A1 7/2012 Butler et al.
2012/0241344 A1 9/2012 Gronau
2012/0252564 A1 10/2012 Moore et al.
2012/0282998 A1 11/2012 Emori
2013/0109455 A1 5/2013 Grauzer et al.
2013/0217474 A1 8/2013 Yang
2013/0316797 A1 11/2013 Gelinotte et al.
2014/0034732 A1 2/2014 Stewart
2015/0377720 A1 12/2015 Conner et al.
2017/0032240 A1 2/2017 Stewart
2017/0039807 A1 2/2017 Shigeta
2018/0357850 A1 12/2018 Moore et al.
2021/0233356 A1 7/2021 Shigeta
2021/0390363 A1 12/2021 Stewart

FOREIGN PATENT DOCUMENTS

EP 0740818 11/1996
JP 201471599 4/2014
WO 2005057372 6/2005
WO WO2016187164 11/2016

OTHER PUBLICATIONS

International Search Report for Application No. PCT/US2016/032797 dated Aug. 30, 2016; 2 pps.
Office Action for U.S. Appl. No. 15/813,151 dated Dec. 4, 2019; 12 pps.

(56) References Cited

OTHER PUBLICATIONS

Notice of Allowance for U.S. Appl. No. 5/813,151 dated Mar. 25, 2020; 6 pps.
Notification of Material Filed by a Third Party for Australian Application No. 2016265851, dated Nov. 2, 2020; 31 pps.
First Examination Report for Australian Application No. 2016265851, dated Sep. 15, 2020; 31 pps.
Office Action for Chinese Application No. 201680024120.2 dated Mar. 25, 2020; 2 pps.
Office Action for Chinese Application No. 201680024120.2 dated Oct. 12, 2020; 13 pps.
Office Action for Philipine Application No. 1-2017-501686 dated Jun. 18, 2021; 5 pps.
Second Examination Report for Australian Application No. 2016265851, dated Aug. 19, 2021; 4 pps.
Third Examination Report for Australian Application No. 2016265851, dated Sep. 10, 2021; 4 pps.
First Examination Report for Australian Application No. 2016265851, dated Oct. 5, 2021; 6 pps.
Office Action for Philippine Application No. 1-2017-501686 dated Sep. 9, 2021; 4 pps.
Notice of Allowance for Philippine Application No. 1-2017-501686 dated Sep. 27, 2021; 3 pps.
Second Examiner's Report for Australian Patent Application No. 2021232726 dated Jan. 21, 2022; 6 pps.
Office Action for U.S. Appl. No. 16/935,150 dated Aug. 3, 2021; 9 pps.
Notice of Allowance or U.S. Appl. No. 16/935,150 dated Nov. 17, 2021; 5 pps.
PR Newswire-2 "GPI to Supply Table Game Products for Newest California Tribal Casino" https://dialog.proquest.com/professional/docview/447303605/1835949C60E560C4594/4?accountid-157 282; Jan. 20, 2009.
Jeff Hecht "Casino Chips to Carry RFID tags" https://www.newscientist.com/article/dn4542-casino-chips-to-carry-rfid- tags/; Jan. 9, 2004.
Wyld "The Ace in the Hole" https://dialog. proquest.com/professional/docview/214846677 /18357F5E5C12DB3FA 1 F/1 ?accountid=1 57282; 2007.
John wehr "Gaming Company Takes RFID to the Casino" https://www.secureidnews.com/news-item/gaming-company-takes-rfid-to-the-casino/#; Dec. 26, 2004.
Alorie Gilbert "Vegas Casino Bets on RFID" https://www.cnet.com/news/privacy/vegas-casino-bets-on-rfid/; Feb. 9, 2005.
Floerkemeier et al. "Smart Playing Cards—Enhancing the Gaming Experience with RFID" https://www .semanticscholar.org/paper/Smart-Playing-Cards-Enhancing-the-Gaming-Experience-Floerkemeier-Mattern/0a5864143c3a2ecfa4ee90d76638cfef91 fdfaa9; 2006.
David C. Wyld "Radio Frequency Indentification: Advanced Intelligence for Table Games in Casinos" https://journals.sagepub.com/doi/10.1177/193896550836147; 2008.
PR Newswire: https://dialog. proquest.com/professional/docview/448560799/1835919BF193F435DCF/6?accountid=15 7282; Sep. 4, 2008.
Tampabay "Wired Chips Track High Rollers" https://www.tampabay.com/archive/2005/06/20/wired-chips-track-high- rollers/; Jun. 20, 2005.
Jose Fermoso "Aces Wild: IT Exec Builds RFID-enabled Poker Table" https://www .wired.com/2008/12/aces-wild-it-ex/; Dec. 19, 2008.
Third Examination Report for Australian Application No. 2021232726 dated Aug. 26, 2022; 3 pps.
Notice of Allowance for U.S. Appl. No. 17/673,945 dated Nov. 7, 2022; 8 pps.
Office Action for U.S. Appl. No. 13/069,278 dated Dec. 13, 2012; 12 pps.
Final Office Action for U.S. Appl. No. 13/069,278 dated Jul. 10, 2013; 18 pps.
Office Action for U.S. Appl. No. 13/069,278 dated Mar. 3, 2014; 18 pps.
Final Office Action for U.S. Appl. No. 13/069,278 dated Jul. 17, 2015; 13 pps.
Office Action for U.S. Appl. No. 13/069,278 dated Feb. 18, 2016; 17 pps.
Notice of Allowance for U.S. Appl. No. 13/069,278 dated Jul. 27, 2016; 5 pps.
Office Action for U.S. Appl. No. 15/353,648 dated Apr. 18, 2018; 12 pps.
Final Office Action for U.S. Appl. No. 15/353,648 dated Nov. 28, 2018; 16 pps.
Office Action for U.S. Appl. No. 16/286,415 dated Apr. 15, 2019; 11 pps.
Notice of Allowance for U.S. Appl. No. 16/286,415 dated Aug. 7, 2019; 5 pps.
Office Action for U.S. Appl. No. 16/670,980 dated Nov. 29, 2019; 9 pps.
Notice of Allowance for U.S. Appl. No. 16/670,980 dated Mar. 9, 2020; 5 pps.
Office Action for U.S. Appl. No. 16/886,373 dated Nov. 23, 2020; 8pps.
Final Office Action for U.S. Appl. No. 16/886,373 dated Mar. 18, 2021; 7 pps.
Office Action for U.S. Appl. No. 16/886,373 dated Jun. 18, 2021; 8 pps.
Final Office Action for U.S. Appl. No. 16/886,373 dated Dec. 16, 2021; 10 pps.
Office Action for U.S. Appl. No. 16/886,373 dated Mar. 25, 2022; 9 pps.
Final Office Action for U.S. Appl. No. 16/886,373 dated Jul. 27, 2022; 11 pps.
Office Action for U.S. Appl. No. 17/974,404 dated Feb. 13, 2023; 12 pps.
International Preliminary Report on Patentability for PCT/US06/08323 dated Nov. 6, 2007; 5 pps.
Office Action for U.S. Appl. No. 12/732,138 dated Jan. 23, 2013; 13 pps.
Notice of Allowance for U.S. Appl. No. 12/732,138 dated Jul. 3, 2013; 10 pps.
Office Action for U.S. Appl. No. 14/053,534 dated Jan. 28, 2015; 19 pps.
Written Opinion for PCT/US06/08323 dated Mar. 7, 2007; 5 pps.
Office Action for U.S. Appl. No. 11/124,486 dated Jan. 25, 2007; 13 pps.
Office Action for U.S. Appl. No. 11/124,486 dated Jun. 22, 2007; 15 pps.
Office Action for U.S. Appl. No. 11/124,486 dated Feb. 7, 2008; 15 pps.
Office Action for U.S. Appl. No. 11/124,486 dated Nov. 17, 2008; 14 pps.
Office Action for U.S. Appl. No. 11/124,486 dated May 22, 2009; 9 pps.
Notice of Allowance for U.S. Appl. No. 11/124,486 dated Mar. 1, 2020; 4 pps.
Final Office Action for U.S. Appl. No. 14/053,534 dated Jan. 25, 2016; 12 pps.
Office Action for U.S. Appl. No. 14/053,534 dated Jul. 9, 2015; 13 pps.
Office Action for U.S. Appl. No. 15/295,885 dated Mar. 9, 2018; 13 pps.
Office Action for U.S. Appl. No. 15/295,885 dated Aug. 25, 2017; 14 pps.
Notice of Allowance for U.S. Appl. No. 14/053,534 dated Jun. 22, 2016; 9 pps.
Office Action for U.S. Appl. No. 15/295,885 dated Mar. 2, 2017; 11 pps.
Office Action for U.S. Appl. No. 15/295,885 dated Aug. 15, 2019; 14 pps.
Office Action for U.S. Appl. No. 15/295,885 dated Mar. 13, 2019; 9 pps.
Office Action for U.S. Appl. No. 15/295,885 dated Jan. 24, 2020; 19 pps.
Notice of Allowance for U.S. Appl. No. 15/295,885 dated May 26, 2021; 11pps.

(56) References Cited

OTHER PUBLICATIONS

Final Office Action for U.S. Appl. No. 15/295,885 dated Mar. 16, 2021; 13 pps.
Office Action for U.S. Appl. No. 15/295,885 dated Oct. 23, 2020; 13 pps.
Office Action for U.S. Appl. No. 15/295,885 dated Jun. 24, 2020; 11 pps.
Office Action for U.S. Appl. No. 17/462,537 dated Oct. 20, 2022; 23 pps.

* cited by examiner
† cited by third party

SYSTEMS AND METHODS OF READING PLAYING CARDS AND OTHER STACKED ITEMS

CLAIM OF PRIORITY

The present application is a Continuation Application of U.S. patent application Ser. No. 17/974,404 filed on Oct. 26, 2022 in the name of Kotab and titled SYSTEMS AND METHODS of READING PLAYING CARDS AND OTER STACKED ITEMS, which application is a Continuation of U.S. patent application Ser. No. 16/886,373, filed on May 28, 2020 in the name of Kotab and titled SYSTEMS AND METHODS of READING PLAYING CARDS AND OTER STACKED ITEMS (now Abandoned), which application is a Continuation Application of U.S. patent application Ser. No. 16/670,980 filed on Oct. 31, 2019 in the name of Kotab and titled SYSTEMS AND METHODS of READING PLAYING CARDS AND OTER STACKED ITEMS (Issued as U.S. Pat. No. 10,706,681 on Jul. 7, 2020), which is a Continuation Application of U.S. patent application Ser. No. 16/286,415 filed on Feb. 26, 2019 in the name of Kotab and titled SYSTEMS AND METHODS of READING PLAYING CARDS AND OTER STACKED ITEMS (Issued as U.S. patent Ser. No. 10/510,208 on Dec. 17, 2019), which is a Continuation Application of U.S. patent application Ser. No. 15/353,648 filed on Nov. 16, 2016 in the name of Kotab and titled SYSTEMS AND METHODS of READING PLAYING CARDS AND OTER STACKED ITEMS (now Abandoned), which is a Continuation Application of U.S. patent application Ser. No. 13/069,278 filed Mar. 22, 2011 in the name of Kotab and titled SYSTEMS AND METHODS of READING PLAYING CARDS AND OTER STACKED ITEMS (which Issued as U.S. Pat. No. 9,508,213 on Nov. 29, 2016), which claims the benefit of priority to U.S. Provisional Application No. 61/316,308 filed Mar. 22, 2010 in the name of Kotab and titled SYSTEMS ANT) METHODS OF READING GAMIN(CHIPS AND OTHER ITEMS STACKED. Each of these Applications is incorporated by reference herein for all purposes.

FIELD OF THE INVENTION

The present invention relates to systems and methods relating to items having wireless devices coupled thereto or embedded therein.

BACKGROUND

Radio Frequency Identification (RFID) technology employs a radio frequency ("RF") wireless link and ultra-small embedded computer circuitry. RFID technology allows physical objects to be identified and tracked via these wireless "tags". It functions like a bar code that communicates to the reader automatically without requiring manual line-of-sight scanning or singulation of the objects. RFID promises to radically transform the retail, pharmaceutical, military, and transportation industries.

Several advantages of RFID technology are summarized in Table 1:

Table 1

Identification without visual contact
Able to read/write
Able to store information in tag
Information can be renewed anytime
Unique item identification
Can withstand harsh environment
Reusable
High Flexibility/Value As shown in FIG. 1, a basic RFID system 100 includes a tag 102, a reader 104, and an optional server 106. The tag 102 includes an integrated circuit (IC) chip and an antenna. The IC chip includes a digital decoder needed to execute the computer commands the tag 102 receives from the tag reader 104. The IC chip also includes a power supply circuit to extract and regulate power from the RF reader; a detector to decode signals from the reader; a back-scattering modulator to send data back to the reader; anti-collision protocol circuits; and at least enough EEPROM memory to store its EPC code.

Communication begins with a reader 104 sending out signals to find the tag 102. When the radio wave hits the tag 102 and the tag 102 recognizes the reader's signal, the reader 104 decodes the data programmed into the tag 102. The information can then be passed to a server 106 for processing, storage, and/or propagation to another computing device. By tagging a variety of items, information about the nature and location of goods can be known instantly and automatically.

The system uses reflected or "backscattered" radio frequency (RF) waves to transmit information from the tag 102 to the reader 104. Since passive (Class-1 and Class-2) tags get all of their power from the reader signal, the tags are only powered when in the beam of the reader 104.

The Auto ID Center EPC-Compliant tag classes are set forth below:

- Class-1
  - Identity tags (RF user programmable, maximum range ~3 m)
- Class-2
  - Memory tags (8 bits to 128 Mbits programmable at maximum ~3 m range)
  - Security & privacy protection
- Class-3
  - Battery tags (256 bits to 64 Kb)
  - Self-Powered Backscatter (internal clock, sensor interface support)
  - ~100 meter range
- Class-4
  - Active tags
  - Active transmission (permits tag-speaks-first operating modes)
  - Up to 30,000 meter range In RFID systems where passive receivers (i.e., Class-1 tags) are able to capture enough energy from the transmitted RF to power the device, no batteries are necessary. In systems where distance prevents powering a device in this manner, an alternative power source must be used. For these "alternate" systems (also known as active or semi-passive), batteries are the most common form of power. This greatly increases read range, and the reliability of tag reads, because the tag doesn't need power from the reader. Class-3 tags only need a 10 mV signal from the reader in comparison to the 500 mV that a Class-1 tag needs to operate. This 2,500:1 reduction in power requirement permits Class-3 tags to operate out to a distance of 100 meters or more compared with a Class-1 range of only about 3 meters.

Conventional RFID tags interact strongly with the electrical and magnetic fields near them; in fact most are resonant with Q-factors ranging between 5 and 100. Unfortunately, this also means that these tags also interact very strongly with each other in ways that often prevents the tags from being read at all. The problem becomes even worse when the tagged objects are thin and flat—like gaming chips, currency, documents, etc. In such a stack, the energy received by each object/tag is highly non-uniform, with the outermost objects receiving most of the energy and the interior objects shielded by the outer objects and receiving virtually no energy at all. In other words, the antenna of the outer tag serves as a Faraday shield to anything behind it. The tags on the outside of the stack will continue to work well, but the tags on the inside of the stack work very poorly if at all. For these reasons conventional wisdom was that it impossible to read a stack of tagged items.

As touched on above, in addition to blocking RF energy, the antennae interfere with RF energy in their vicinities, potentially rendering the RF signal unreadable to tags nearby. This phenomenon is best understood by considering the radar profile of the antenna. The radar profile of the antenna may often be larger than the actual physical profile of the antenna, and can be a large as 100× the physical profile of the antenna. Accordingly, the problems mentioned above can also be found in assemblies of tagged objects that are not necessarily stacked.

There are many instances where tags could be stacked or assembled in close proximity. One implementation is in gaming chips. Another is paper objects such as birth certificates, paper currency, etc. Significant tag-to-tag interactions and variability also occur even with a row of tagged objects sitting on a shelf. It would be desirable to read a stack of gaming chips, stack of tagged currency, file of papers, etc. in one pass via RFID technology.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

Figure 1:
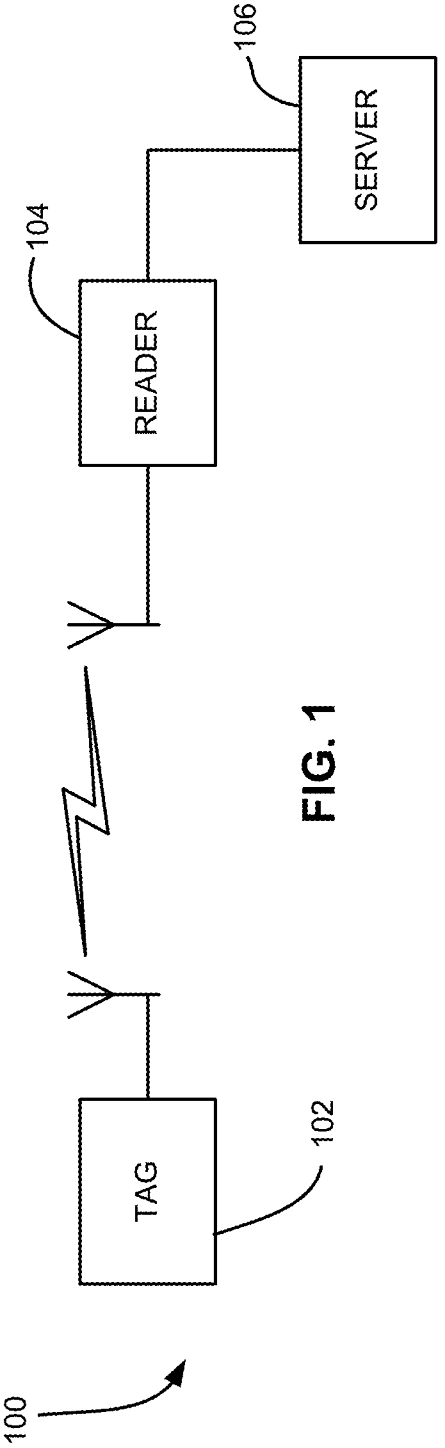
FIG. 1 is a system diagram of an RFID system.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

A method according to one general embodiment includes determining a value of a gaming chip or chips at a table or player position; detecting a change in value of the gaming chip or chips at the table or player position; and determining whether the change in value is valid. A system for performing the method may include a processor and/or other hardware and/or logic for performing one or more of the operations of the method. The processor may be hardware associated with a reader, and/or may be part of a system in communication with the reader such as a backend system, server, network-accessible site or device, etc.

A method according to another general embodiment includes determining a value of a gaming chip or chips at a player position using a radio frequency signal; recording in a database the value of the gaming chip or chips at the player position in association with identity information of the player. A system for performing the method may include a processor and/or other hardware and/or logic for performing one or more of the operations of the method. The processor may be hardware associated with a reader, and/or may be part of a system in communication with the reader such as a backend system, server, network-accessible site or device, etc.

A method according to another general embodiment includes determining values of gaming chips played at a player position on a gaming table during games; recording in a database the values of the gaming chips played at the player position in association with identity information of the player. A system for performing the method may include a processor and/or other hardware and/or logic for performing one or more of the operations of the method. The processor may be hardware associated with a reader, and/or may be part of a system in communication with the reader such as a backend system, server, network-accessible site or device, etc.

A system according to another general embodiment includes a gaming table having a plurality of player positions; and a radio frequency (RF) antenna near each player position for wirelessly communicating with at least one of gaming chips and an item preassociated with a particular player at each player position of a gaming table. Gaming chips may also be part of the system.

Some embodiments of the present invention may use a Radio Frequency (RF) device with a circuit and a "semi-transparent" antenna of a type disclosed in U.S. Patent Pub. No. 2006/0250251 A1, published Nov. 9, 2006, which is herein incorporated by reference. The semitransparent antenna gathers some of the RF energy, but most of the energy in the RF wave does not couple into the antenna. Accordingly, because the antenna in some such embodiments minimally affects the electromagnetic RF fields surrounding the antenna even in the vicinity of the antenna, assemblies of objects carrying the RF devices can be formed while maintaining acceptable communications with the RF devices.

Other embodiments may use conventional antenna designs of a type known in the art.

Many types of devices can take advantage of the embodiments disclosed herein, including but not limited to Radio Frequency Identification (RFID) systems and other wireless devices/systems; pacemakers; portable electronic devices; remote controllers for televisions, audio devices, and other electronic devices; smoke detectors; etc. To provide a context, and to aid in understanding the various embodiments of the invention, much of the present description shall be presented in terms of an RFID system such as that shown in FIG. 1. It should be kept in mind that this is done by way of example only, and the invention is not to be limited to RFID systems, as one skilled in the art will appreciate how to implement the teachings herein into electronics devices in hardware and/or software, either or both of which may be generally referred to as "logic." Examples of hardware include Application Specific Integrated Circuits (ASICs), printed circuits, monolithic circuits, reconfigurable hardware such as Field Programmable Gate Arrays (FPGAs), etc. Further, the methodology disclosed herein can also be incorporated into a computer program product, such as a computer disc containing software. Further, such software can be downloadable or otherwise transferable from one computing device to another via network, nonvolatile memory device, etc.

Figure 2:
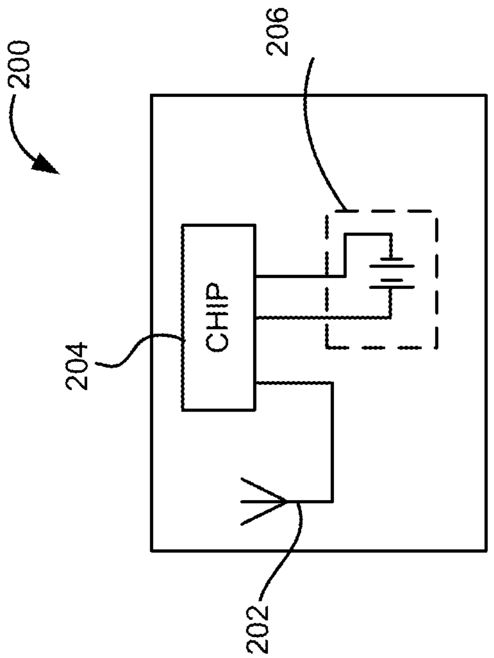
FIG. 2 is a high level circuit diagram showing a circuit for implementation in a RF device according to one embodiment.

FIG. 2 illustrates a Radio Frequency (RF) device 200, e.g., RFID tag according to one embodiment. The radio frequency data communication device 200 includes an integrated circuit 204, a power source 206 connected to the integrated circuit 204 to supply power to the integrated circuit 204, and at least one antenna 202 connected to the integrated circuit 204 for radio frequency transmission and reception by the integrated circuit 204. For purposes of this disclosure, including the appended claims, the term "integrated circuit" and "circuit" shall be defined as a combination of interconnected circuit elements associated on or within a continuous substrate. For purposes of this disclosure, including the appended claims, the term "semiconductive substrate" is defined to mean any construction comprising semiconductive material, including, but not limited to, bulk semiconductive materials such as a semiconductive wafer (either alone or in assemblies comprising other materials thereon), and semiconductive material layers (either alone or in assemblies comprising other materials). For purposes of this disclosure, including the appended claims, the term "substrate" refers to any supporting structure, including, but not limited to, the semiconductive substrates described above, printed circuit boards (PCBs), adhesive backings, etc. In the embodiment illustrated in FIG. 2, the integrated circuit 204 is a monolithic integrated circuit. For purposes of this disclosure, including the appended claims, the term "monolithic integrated circuit" shall be defined as an integrated circuit wherein all circuit components are manufactured into or on top of a single chip of silicon or layer of semiconductive material. The integrated circuit 204 will be described in greater detail below. The power source 206 is a battery and/or a power supply circuit that extracts and regulates power from the RF reader signal.

The radio frequency data communication device 200 can be included in any appropriate housing or packaging, made of plastic or any other suitable material. The device 200 is of a small size that lends itself to applications employing small housings, such as cards, miniature tags, etc. Larger housings can also be employed. The device 200, housed in any appropriate housing, can be supported from or attached to an object in any desired manner; for example using double sided tape, glue, lanyards, leash, nails, staples, rivets, or any other fastener. The housing can be sewn on to an object, hung from an object, implanted in an object (hidden), etc. A description of illustrative RFID tags, systems, and methods of user are disclosed in U.S. Patent Appl. Pub. No. 2004/0201457A1 to O'Toole et al., which is herein incorporated by reference.

Figure 3:
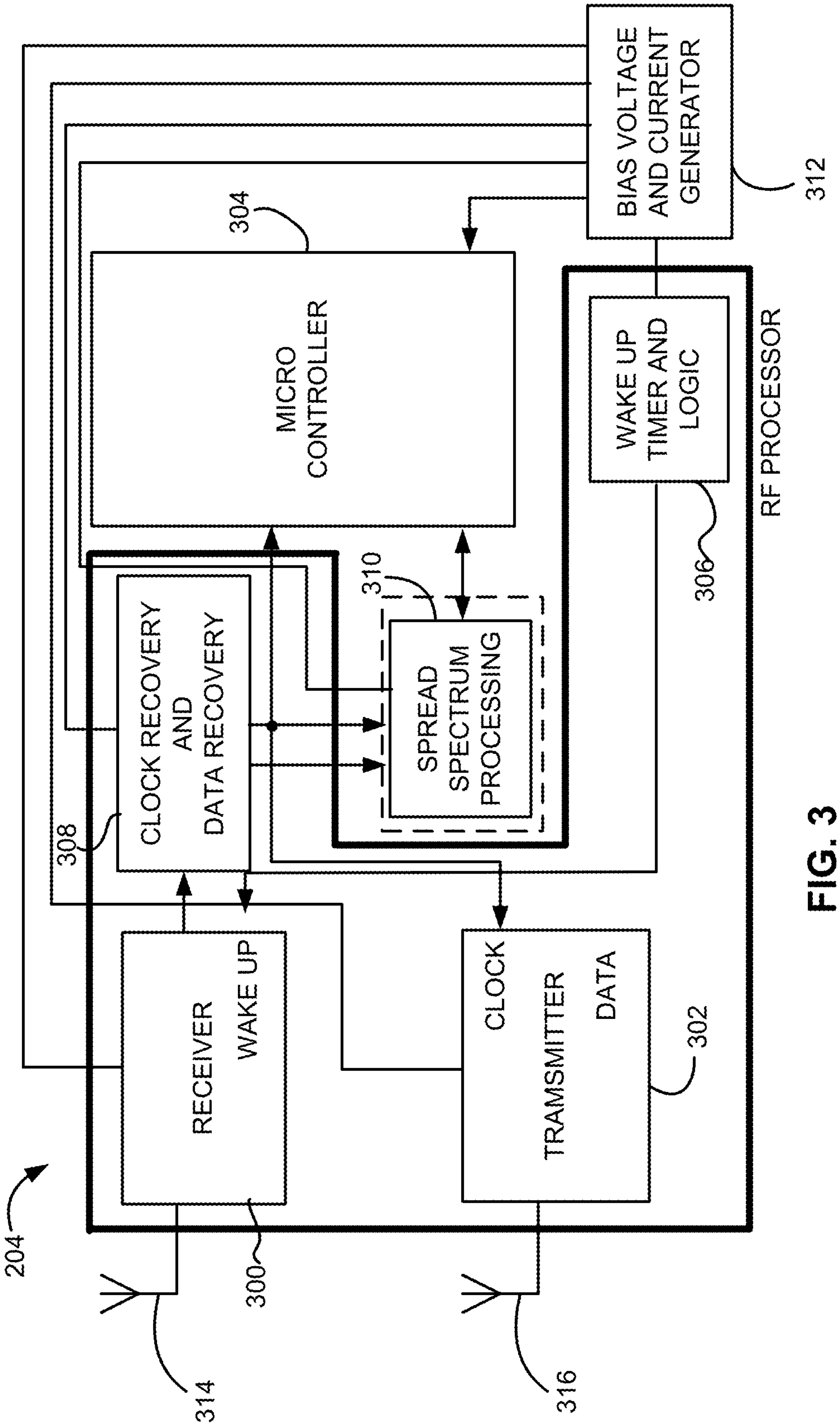
FIG. 3 is a high level circuit diagram of a monolithic semiconductor integrated circuit that may form part of the circuit of FIG. 2.

Various configurations are possible for the antenna 202. The integrated circuit 204 includes a receiver 300 and a transmitter 302 (FIG. 3). In one embodiment, separate antennas 314 and 316 are provided for receiver and transmitter of the integrated circuit 204. In another embodiment (FIG. 2), a single antenna is shared by the receiver and transmitter sections. In one embodiment, the antenna is defined by conductive paste (e.g., epoxy) screened onto a card or housing. In another embodiment, the antenna is formed of a conducting polymer. An advantage of conducting polymers is that the sheet resistivity is controllable in a range from 1 Ω/sq to 1,000,000 Ω/sq. In the illustrated embodiment, the antenna is a planar conductive material such as Indium Tin Oxide or other suitable high sheet resistance metal-based material conductively bonded to the integrated circuit via bonding pads.

In an embodiment where a single antenna is employed, that single antenna can be a folded dipole antenna defining a continuous conductive path, or loop, of microstrip. Alternatively, the antenna can be constructed as a continuous loop antenna. Additional antenna designs are disclosed in copending U.S. patent application Ser. No. 11/073,239 filed on Mar. 4, 2005 with title "COMPACT OMNI-DIRECTIONAL RF SYSTEM," and which is herein incorporated by reference.

In some embodiments described herein, the tag antennas are designed to control and limit their interactions with the RF fields such that most of the RF wave striking or in the immediate vicinity of the antenna does not couple into the antenna. Thus, the antenna minimally affects the electromagnetic RF fields surrounding the antenna even in the vicinity of the antenna. By "minimally affects" what is meant is that at least about 50%, and preferably greater than about 90%, of the RF energy striking the antenna and in the vicinity of the antenna is useable by another RF device in the vicinity of the tag.

In this antenna design, the inductive impedance elements are reduced and the antenna impedance increased to the point where the residual inductance of the tag antenna has only minimal effect on the antenna's impedance. Such antennas are preferably constructed of a planar conductor having a sheet resistivity of greater than about 1 Ω/sq, preferably greater than about 10 Ω/sq. To prevent excessive loading of this high impedance antenna, the tag circuit input impedance is preferably as high as possible. A total impedance of the RF device presented to the RF wave is preferably greater than about 10000. One embodiment has a resistive impedance of >100 KΩ, and an input bypass capacitance of less than 0.02 pf corresponding to a reactive bypass impedance of at least about 10 K. At 900 MHz, a non-resonant antenna design may include fabricating the antenna using conductors with a sheet resistivity of, for instance about 1000 Ω/sq, and designing the tag to have a total tag impedance of perhaps 100 KΩ.

The impedance of the semi-transparent tags may be adjusted to the objects to which they are attached so that even a tightly packed assembly of such objects will appear to the RF propagating signal as a moderately lossey RF propagation medium. For instance, tags on stackable boxes 10 mm thick could be equipped with 10 KΩantennas; tags on 1 mm thick gaming chips could have 100 KΩantennas; tags on 0.2 mm thick currency could have 500 KΩantennas, etc. The total admittance or dissipation-factor of the tag/package system is preferably kept roughly constant per volume so that RF radiation can pass through the assembly without excessive attenuation or reflection.

While the individual performance of these semi-transparent tags will be significantly inferior to the individual performance of conventional tags, the performance of these semi-transparent tags will not be degraded as much by the presence of other near-by semi-transparent tags. For example, while a conventional tagged gaming chip might have a 100 m range in free space, the range of that same tagged gaming chip would be reduced to less than 0.01 m when sandwiched between a dozen of other similar gaming chips.

On the other hand, a gaming chip with a semi-transparent design might have a free space range of only 10 m, but continue to work at up to 3 m even when totally surrounded by other gaming chips tagged with semi-transparent devices.

This technique therefore provides a way to tag objects and read them even under adverse conditions that has heretofore been considered impossible. This includes directly reading a stack of currency or other paper documents, reading tags on the inside of a stack of gaming chips, etc. Preferably, for a plurality of RFID tagged objects, an operating range of the objects varies by less than 50% even when the objects are positioned directly adjacent (e.g., on top of or beside) one another.

With continued reference to FIG. 2, if the power source 206 may be a battery. The battery can take any suitable form. Preferably, the battery type will be selected depending on weight, size, and life requirements for a particular application. Preferably, the battery is formed by thick film deposition of high-sheet-resistivity materials so that the battery itself is also semi-transparent to the RF carrier signal. Alternatively, a metallic button-type cell could be used as long as the battery size is kept small compared to the wavelength of the RF carrier. Instead of using a battery, other suitable power sources can be employed such as RF energy harvesting circuitry as described below and/or of a type known in the art.

FIG. 3 is a high level circuit schematic of the integrated circuit 204 utilized in the device of FIG. 2. In the embodiment shown in FIG. 3, the integrated circuit 204 is a monolithic integrated circuit. More particularly, in the illustrated embodiment, the integrated circuit 204 includes the receiver 300, the transmitter 302, a micro controller or microprocessor 304, a wake up timer and logic circuit 306, a clock recovery and data recovery circuit 308, and a bias voltage and current generator 312.

In one embodiment, a spread spectrum processing circuit 310 is also included in the integrated circuit 204 and formed relative to the single die. In this embodiment, signals received by the receiver 300 are modulated spread spectrum signals. In an illustrated embodiment, the modulation scheme for replies sent by the transmitter 302 can be selectable. One of the available selections for replies sent by the transmitter 302 is modulated spread spectrum.

In a method of use, an RFID reader sends an interrogation signal to one or more RFID tags in range of the reader. One skilled in the art will appreciate that any suitable communication protocol, including security features, can be used. A tag receiving the signal responds with a tag ID. The reader can then use that tag ID to address that particular tag, causing the tag to transmit its stored data. The stored data can be any variety of information, and is normally associated with the article to which the tag is attached. The reader can then tell the tag to turn-off for now so that it will not continue to respond to the interrogation signal. The reader will then select another tag ID and poll that tag for its data, and so on until all of the tags have been read. Any singulation technique known in the art may be used.

A gaming chip according to one embodiment includes a body, preferably of conventional shape appropriate for the game(s) with which the gaming chip is generally played, and preferably formed at least in part of an RF transmissive (including RF transparent) material such as resin, ceramic, plastic, etc. The gaming chip may also include a circuit; and an antenna coupled to the circuit, where at least 50% of the RF energy striking the antenna passes through the antenna.

In another embodiment, a gaming chip includes a circuit on or within a substrate; and an antenna coupled to the circuit, wherein the antenna minimally affects electromagnetic RF fields surrounding the antenna even in the vicinity of the antenna.

In further embodiments, peripheral antennas may be used. Such antennas may extend along the round outer periphery of the gaming chip for at least a portion of the length of the antenna. In yet other embodiments, the antenna and/or circuitry may be positioned off-center and/or configured so that the antennas of the gaming chips are misaligned when the gaming chips are in a stack. An example of such an embodiment may have a bow-tie shaped antenna, where the typical randomness of stacking would tend to result in the wings of the bow-tie shaped antenna being misaligned in the axial direction of the stack.

A method for reading a gaming chip according to one embodiment includes obtaining an identifier from a gaming chip e.g., by causing a reader and/or an antenna to send a wireless interrogation signal and receive a response from a gaming chip in response to the interrogation signal, by reading a memory storing the identifier previously received from the gaming chip, by requesting the identifier from another system that can or has communicated with the gaming chip, etc.; where the response includes an identifier, wherein the identifier is obtained from the gaming chip at least in part by wireless communication with the gaming chip somewhere in the communication chain; determining whether the identifier is invalid according to some predefined criterion; and outputting an indication that the identifier is invalid if the identifier is determined to be invalid and/or outputting an indication that the identifier is valid. Of course, as is well known in the gambling industry, gaming chips may be known as poker chips, playing pieces, etc. Generally, gaming chips are associated with a monetary value or a point value, which may in turn be converted to a monetary value or its equivalent.

A system for performing the method may include a processor and/or other hardware, optionally in combination with additional logic, for performing one or more of the operations of the method. The processor may be hardware associated with a reader, and/or may be part of a system in communication with the reader such as a backend system, server, network-accessible site or device, etc.

In one approach, the identifier is unique to the gaming chip. For example, the identifier may include a unique serial number or other identifier of the gaming chip or circuit.

In another approach, the identifier or portion thereof is unique to a casino (including an entity that owns the casino or family of casinos). For example, the gaming chips associated with a particular casino may have a casino-specific identifier, which may be the sole identifier or a portion of a larger identifier. Identifiers in various embodiments may include codes, serial numbers, etc.

In one embodiment, the determination of whether the identifier is valid may include comparing the received identifier to a set of valid identifiers. The set of valid identifiers may be in a table, database, etc. and may correspond to gaming chip identifiers (including identifiers assigned to the gaming chip and/or circuit (RFID tag) therein) that, e.g., the casino has authorized for use therein, are known to be valid, were received from a manufacturer, etc. The set may be available locally; accessible via network connection e.g., to a remote server; online from a remote site; etc. Moreover, the set may include monetary values and other information associated with the gaming chips, such as source and/or owner/provider of the chip; information useful for statistical purposes including last date chip was read, where chip was played, where the chip has traveled to (e.g., within a casino, to which other casinos, etc.), who purchased or won the chip, etc.; etc.

In another embodiment, determining whether the identifier is invalid includes comparing the received identifier to identifiers of other gaming chips present in a physical location such as a casino, set of casinos, Las Vegas, etc. In one approach, some or all of the readable gaming chips in the casino are polled and their identifiers are stored, at least temporarily, for use in the comparison. If two gaming chips have the same identifier, then it is likely that one of them is counterfeit and an indication that one or both of the chips is invalid may be output. Moreover, the general locations of the gaming chips having the matching identifiers may be determined and output.

In yet another embodiment, determining whether the identifier is invalid includes deciding that the identifier cannot be determined to be valid. For example, the determining step may actually be a validating step, where inability to validate the identifier results in a determination that the identifier is invalid. Thus, an alternate embodiment may output an indication that the identifier is valid depending on the result of a validating step, regardless of whether an indication of invalidity is output.

As an option, an alert may be output if it is determined that the identifier is invalid. The alert may be visible, audible, electronic, etc. For example, the alert may include a textual message to an operator; a location on a graphical map of a location or layout of a building; an identification of a doorway or area in the vicinity of the invalid chip; a video or picture of the vicinity of the invalid chip (to perhaps see the person carrying the chip); a light on a gaming table; a readout on a podium screen in the pit of a gaming area; etc.

In one embodiment, a general vicinity of the gaming chip may be determined. This may be determined, e.g., by identifying the antenna or reader that is in closest proximity to the chip, triangulation techniques known in the art, etc.

Preferably, the method is successfully performed for each of a plurality of gaming chips while the gaming chips are stacked. For example, all gaming chips in a stack may be read while in the stack. Gaming chips are usually maintained and/or transported by players, staff, etc. in stacks. The unique designs of some embodiments of the gaming chips disclosed herein allow reading of a stack of gaming chips.

In one approach, the method is performed individually for each of a plurality of gaming chips at a player location of a table. In another approach, the method is performed when the gaming chip is near a doorway. For example, a stationary antenna may be positioned near the doorway to read gaming chips passing therethrough. In yet another approach, the method is performed when the gaming chip is near a cage area. The “cage” is a term known in the art to refer to a location where players may convert gaming chips in to currency or credit, and vice versa.

While various embodiment disclosed herein are compatible with fixed antenna positions, the same and other embodiments may advantageously be used with a handheld reader, where the wireless interrogation signal is sent from an antenna of a handheld reader. Moreover, the handheld reader may perform some or all operations of the method. In one embodiment, a handheld reader can be used to find a particular gaming chip, whether valid or invalid, using known techniques such as proximity detection techniques, etc. In one approach, the poker chip may be read over and over again, and its general location determined based on a strength of the response, it being presumed that the response from the gaming chip will be stronger as the handheld reader antenna becomes closer to the gaming chip.

In one embodiment, a value of the gaming chip may be determined. In another embodiment, the identifier is changeable. For example, the identifier may be stored in a memory or logic of the gaming chip, and selectively updated or overwritten.

A method for reading a gaming chip according to one embodiment includes obtaining an identifier from a gaming chip e.g., by causing a reader and/or an antenna to send a wireless interrogation signal and receive a response from a gaming chip in response to the interrogation signal, by reading a memory storing the identifier previously received from the gaming chip, by requesting the identifier from another system that can or has communicated with the gaming chip, etc.; where the response includes an identifier, wherein the identifier is obtained from the gaming chip at least in part by wireless communication with the gaming chip; determining a source of the gaming chip based on the identifier; and outputting an indication of the source to at least one of a user, a computer, and an application. The indication may be an identification of the source, some identifier associated with the identity of the source, etc.

A system for performing the method may include a processor and/or other hardware, optionally in combination with additional logic, for performing one or more of the operations of the method. The processor may be hardware associated with a reader, and/or may be part of a system in communication with the reader such as a backend system, server, network-accessible site or device, etc.

The source of the gaming chip may be a casino, entity, etc. The source of the gaming chip may also refer to a player that obtained the gaming chip, e.g., at a table, the cage, etc.

In one approach, at least a portion of the identifier identifies the casino, wherein another portion of the identifier is unique to the gaming chip. In other approaches, the identifier may correspond only to the source, and a second identifier may be unique to the gaming chip. In another approach, the identifier includes a portion that identifies the source and another portion that is unique to the gaming chip.

In one embodiment, determining a source of the gaming chip includes comparing the received identifier or portion thereof to a set of data corresponding to potential sources of the gaming chip. The set may be in a table, database, etc. that may include codes that correspond to sources such as casinos, vendors, players or manufacturers; may be received from a manufacturer; etc.

A value of the gaming chip may also be determined, e.g., by comparing the identifier to a set of data, by recognizing a portion of the identifier preassociated with a value, etc.

Preferably, the method is successfully performed for each of a plurality of gaming chips while the gaming chips are stacked.

A method for verifying a payout amount, according to one embodiment, includes determining a value of a gaming chip (including multiple chips) at a table or player position during a game; detecting a change in value of the gaming chip (again, and in all instances, including multiple chips) at the table or player position; and determining whether the change in value is valid. Thus, for example, an antenna at a player station of a blackjack table (e.g., on the table under the table covering, embedded in the table, above or below the table using a directional antenna, etc.) may determine that chips valued at $1100 are present at the player's position at the start of a game, e.g., by detecting a $1000 chip and a $100 chip. If the player wins, the payout should be $1100, which when combined with the original bet will make the total value present at the station $2200. If, however, the system detects that the value of the gaming chips has jumped to $3100, then it is likely that the dealer has unintentionally or nefariously given the player two $1000 chips instead of the one $100 and one $1000 chip matching the original bet.

A system for performing the method may include a processor and/or other hardware, optionally in combination with additional logic, for performing one or more of the operations of the method. The processor may be hardware associated with a reader, and/or may be part of a system in communication with the reader such as a backend system, server, network-accessible site or device, etc.

The start or end of a game may be detected, and the method performed thereafter. The start or end of the game may be determined, for example, by detecting a signal from a dealer-actuated switch that is pushed prior to or at the start of a game, etc. The start or end of a game may also be deduced by logic that infers the start of a game from a change in chip values on the table (e.g., by detecting removal and/or addition of gaming chips from player positions, detecting removal of payouts, etc.)

In one approach, the start of the game is detected by receiving a signal from a sensor coupled to a card shoe. Such a sensor may be a switch that is actuated as a card is removed from the shoe, an optical sensor that detects movement of a card from the shoe, etc. In another approach, the start of the game is detected by receiving a signal initiated by a dealer e.g., as a result of the dealer tripping a switch, stepping on a pedal, etc. In yet another approach, the start of the game is detected by detecting no change in value of the gaming chips at the table for a predetermined amount of time. Typically, no player may change the amount of money played while the initial cards are being dealt. For example, in blackjack, once the first cards come out of the shoe, a player may not change his or her bet unless some special situation exists, such as the ability to double down or split cards.

Preferably, the method is successfully performed for each of a plurality of gaming chips while the gaming chips are stacked. For example, all gaming chips in a stack may be read while in the stack. Gaming chips are usually maintained and/or transported by players, staff, etc. in stacks. The unique designs of some embodiments of the gaming chips disclosed herein allow reading of a stack of gaming chips.

A method for loyalty tracking according to one embodiment includes determining a value of a gaming chip (including multiple chips) at a player position (including positions if the player is playing more than one position) at the start of the game using a radio frequency signal; and recording in a database the value of the gaming chip (including multiple chips) at the player position in association with identity information of the player. Thus, for example, an antenna at a player station of a blackjack table (e.g., on the table under the table covering, embedded in the table, etc.) may determine that $1100 is present at the player's position at the start of a game, by detecting a $1000 chip and a $100 chip. The recording can be performed on a per-game bases; the amounts can be accumulated, averaged, etc. over several games; statistics calculated and stored; etc. The identity information may be or correspond to the player's name, loyalty program identifier (e.g., player card number), etc.

This approach allows, for example, more accurate and consistent tracking of amounts expended by players at a casino. Present methods of loyalty tracking at a gaming table rely on a "pit boss" or other human to periodically monitor a player to estimate how much a player has played, how long a player has been playing, etc.

A further embodiment includes compiling information such as a value of chips in a player's possession, identities of other casinos a player has visited by identifying the source of the gaming chips in the player's possession, etc. in combination with determining an identity of the player such as by reading a loyalty card of the player that is in proximity to the chips, reading the poker chips at a hotel room door and/or in a hotel room in which the player is staying, etc.

In addition, advertising and/or offers may be presented to a player based on information such as source(s) of the chips in the player's possession, value of the chips in the player's possession, identity of the player, status of the player in a loyalty program, etc.

A system for performing the method may include a processor and/or other hardware, optionally in combination with additional logic, for performing one or more of the operations of the method. The processor may be hardware associated with a reader, and/or may be part of a system in communication with the reader such as a backend system, server, network-accessible site or device, etc.

To allow correlation of the player and the player position, an identifier of the player may be received. Illustrative examples of how the identifier of the player can be received include reading of a wireless device (e.g., RFID tag, loyalty card, etc.) corresponding to the player; receiving an identifier obtained from a players card of the player, e.g., from a card reader; etc. See also embodiments presented herein for identifying a player and associating the player with a stack of chips.

In one approach, a change in value of the gaming chip or chips at the player position may be detected and the change in value stored in the database. If the player wins, the payout should be $1100, which when combined with the original bet will make the total value present at the station $2200. This value can be recorded. Likewise, if the player loses, no chips will be read at the player position, and the value of the chips lost may be recorded. Various approaches may be used to improve accuracy. For example, to determine whether the player has won or lost, the value change of the chips at the player position should be equal to the inverse value change in the chip tray (and/or tip box if present). The recording can be performed on a per-game basis; the amounts can be accumulated, averaged, etc. over several games; etc.

Amounts purchased, played, won and/or lost may also be tracked for loyalty program purposes. In one approach, points are assigned to the player based on the recorded amounts. For example, when a player purchases chips, the dealer may place the player's loyalty card and the chips being purchased at a location on the table where the card and chips are read using RF signals, thereby allowing correlation of the purchase with the player.

Again, the method is preferably successfully performed for each of a plurality of gaming chips while the gaming chips are stacked. For example, all gaming chips in a stack may be read while in the stack. Gaming chips are usually maintained and/or transported by players, staff, etc. in stacks. The unique designs of some embodiments of the gaming chips disclosed herein allow reading of a stack of gaming chips.

A method for loyalty tracking according to one embodiment includes determining values of gaming chips (including multiple chips possibly stacked one atop another) played at a player position (including positions if the player is playing more than one position) on a gaming table of any type during games; where a player position may denote an “in play” location where the gaming chips are in play on the table. Such locations are usually (but not always) denoted by some type of indicia, box, line, etc. Examples include the pass line on a craps table, a rectangle on a blackjack table, a general playing position on a poker table, etc. A player position in some embodiments may also denote an area including the “in play” position and a region behind the in play position (relative to the dealer), where a player usually stacks gaming chips that are not currently in play. The values of the gaming chips played at the player position in association with identity information of the player are recorded in a database. Thus, for example, an antenna at a player station of a blackjack table (e.g., on the table under the table covering, embedded in the table, etc.) may determine that $1100 is present at the player's position at the start of a game, by detecting a $1000 chip and a $100 chip.

In one approach, changes in values of the gaming chips at the player position are detected and the changes in values are stored in the database. If the player wins, the payout should be $1100, which when combined with the original bet will make the total value present at the station $2200. This value can be recorded. Likewise, if the player loses, no chips will be read, and the value of the chips lost may be recorded. Various approaches may be used to improve accuracy. For example, to determine whether the player has won or lost, the value change of the chips at the player position should be equal to the inverse value change in the chip tray (and/or tip box if present). The recording can be performed on a per-game basis; the amounts can be accumulated, averaged, etc. over several games; etc.

Points may be assigned to the player based on the recorded amounts.

Again, the method is preferably successfully performed for each of a plurality of gaming chips while the gaming chips are stacked. For example, all gaming chips in a stack may be read while in the stack. Gaming chips are usually maintained and/or transported by players, staff, etc. in stacks. The unique designs of some embodiments of the gaming chips disclosed herein allow reading of a stack of gaming chips.

A system for performing the method may include a processor and/or other hardware and/or logic for performing one or more of the operations of the method. The processor may be hardware associated with a reader, and/or may be part of a system in communication with the reader such as a backend system, server, network-accessible site or device, etc.

In further embodiments, loyalty tracking may be enabled across various geographically distinct locations, such as tables or areas in a casino, at remote casinos, restaurants, etc., and the data associated therewith compiled by a processing system in communication with the various other locations. Accordingly, various embodiments described herein may be deployed at the various locations as part of a larger distributed system according to some embodiments, with data being compiled, e.g., by a centralized system that manages and/or records some aspect of the loyalty program.

Figure 4:
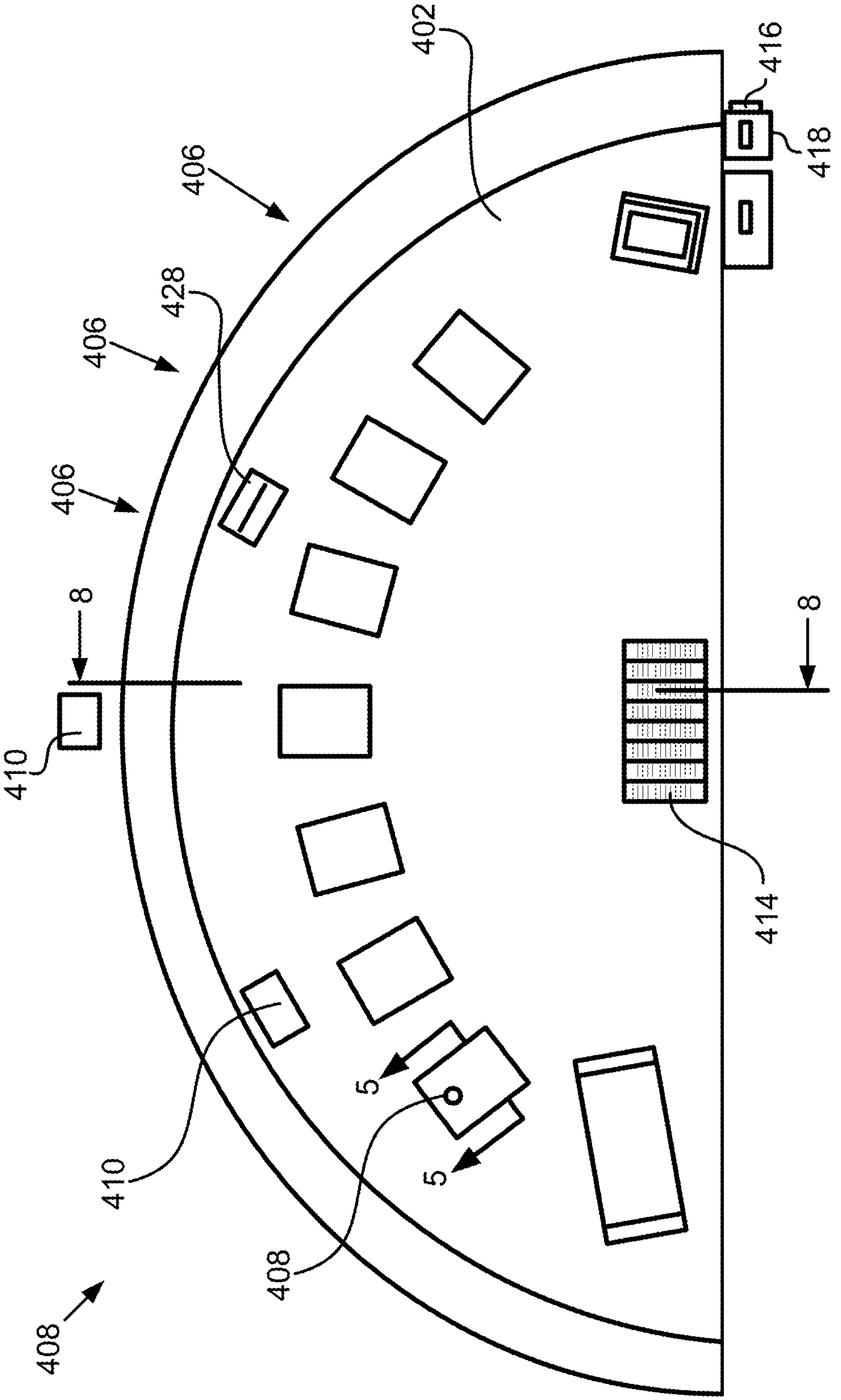
FIG. 4 illustrates a system according to one embodiment.
Figure 5:
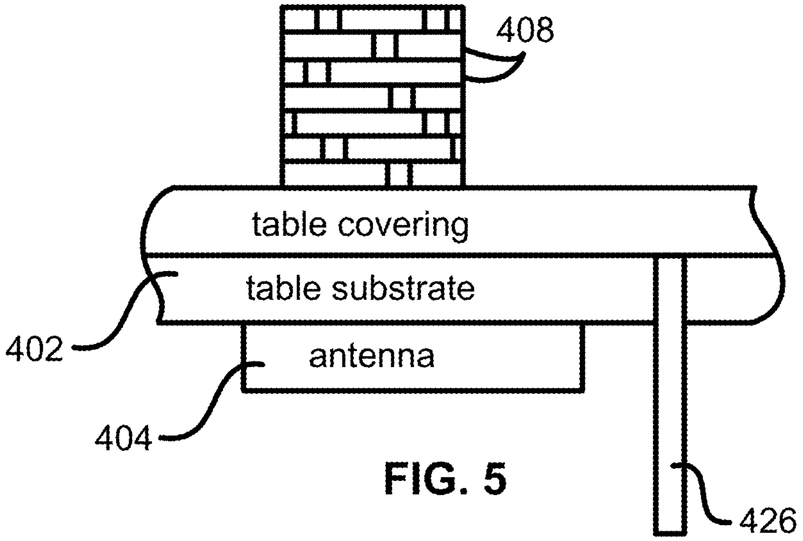
FIG. 5 is a partial cross sectional view taken along Line 5-5 of FIG. 4.

A system 400 according to one embodiment is shown in FIG. 4. FIG. 5 is a partial cross sectional view of FIG. 4 taken along Line 5-5 of FIG. 4. As shown, the system includes a gaming table 402 having an RF antenna 404 near each player position 406 for wirelessly communicating with gaming chips 408 and/or a wirelessly-readable loyalty card 410 at each player position of a gaming table. A “loyalty card” as referred to herein is meant to denote any device or thing that is known to some system to be associated with a particular human, e.g., any item preassociated with a particular player, and not necessarily having a card form factor or being associated with a loyalty program. The loyalty card may have an antenna and an RF circuit for enabling wireless communication therewith. Two loyalty cards are shown. The antennas may be coupled to a reader positioned at the table, remotely therefrom, or to a backend system that acts as a reader.

Figure 6:
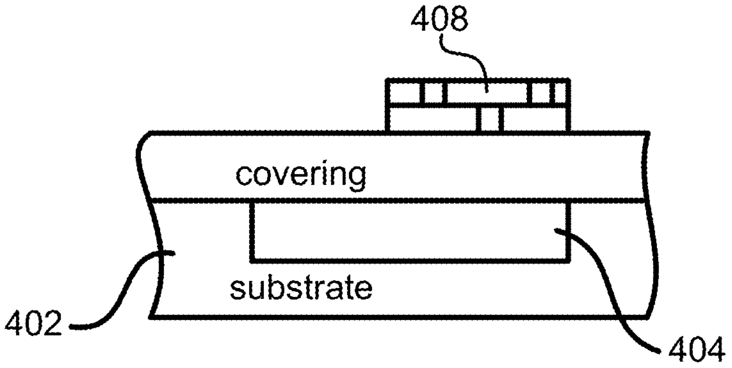
FIG. 6 is a partial cross sectional view of a system according to one embodiment.
Figure 7:
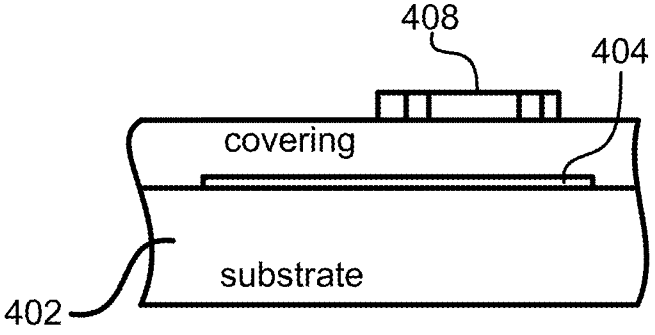
FIG. 7 is a partial cross sectional view of a system according to one embodiment.

As shown, the RF antenna 408 is positioned under the table. However, the RF antenna may be embedded in the table as shown in FIGS. 6 and 7. Moreover, the RF antenna need not lie in a plane parallel to the tabletop, but may be oriented at an angle relative thereto, e.g., may face the player's head, etc. See antenna 404 of FIG. 8.

Figure 8:
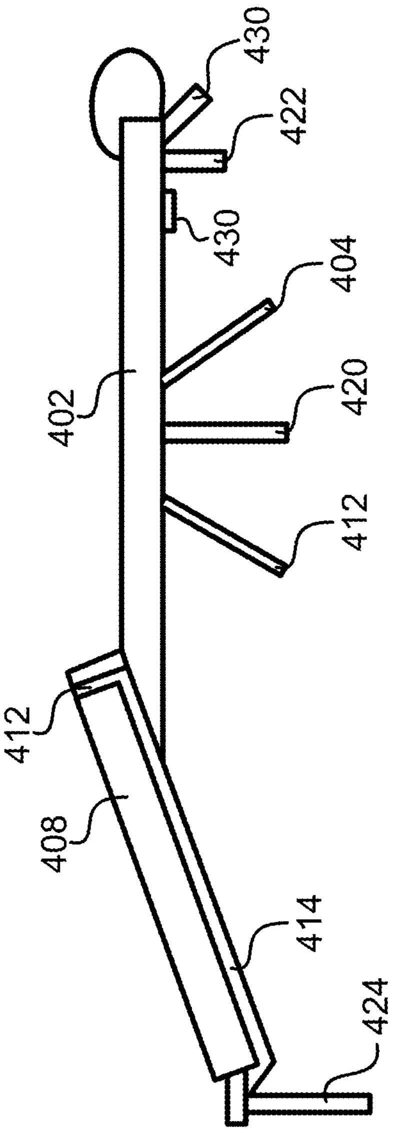
FIG. 8 is a partial cross sectional view taken along Line 8-8 of FIG. 4.

In addition, an RF antenna 412 may be positioned near a tray 414 of the gaming table for wirelessly communicating with gaming chips in the tray. The antenna 412 may be placed in any appropriate location, including that shown, etc. Moreover, multiple antennas may be used. Two antennas 412 are shown in FIG. 8.

Directional antennas may be used. Any type of directional antenna known in the art may be used, including patch antennas. Also preferably, the range of the RF antenna is limited so as to avoid or minimize reading the chips on an adjacent table, player position, etc. Thus in one approach, the RF antenna near the tray of the gaming table is directional. In another approach the RF antennas near the player positions are directional. In yet another approach, a directional antenna may be constructed by using shielding to limit the effective communications area of the antenna. For example, a directional or nondirectional antenna may be coupled to a gaming table under a player position. An open-topped box of RF shielding material may be positioned around the sides and bottom of the antenna, thereby limiting side reading by the antenna.

In one embodiment, an RF antenna 416 may be positioned near a tip box 418 of the gaming table for wirelessly communicating with gaming chips in the tip box. This allows such features as correlating the amount of tips earned with a particular dealer known to be dealing at the table at the time the chip was read, etc.

Shields may also be employed. For example, a shield may be positioned between gaming chips in the tip box and gaming chips in the tray. For example all or a portion of the tip box and/or tray may be constructed of a shielding material, where a shielding material is one that blocks at least 95% of RF energy (RF signal) encountering the shielding material through reflection and/or absorption of the RF energy. In another approach, a shielding wall may be present between the player position and/or tray and/or tip box.

A shield 420 may be positioned between gaming chips at the player position and gaming chips in the tray.

A shield 422 may be positioned between an RF antenna and a player side of the table for shielding a player from RF energy emitted by the RF antenna. For example, the shield may be a wall that extends downwardly from the table between the tray and the expected player location.

A shield 424 may be positioned between an RF antenna and a dealer side of the table for shielding a dealer from RF energy emitted by the RF antenna. For example, the shield may be a wall that extends downwardly from the table between the tray and the expected dealer location. In another approach, the shield may be arcuate, semi-circular, semi-ovular, circular, ovular, semi-polygonal, polygonal, etc. For example, a rectangular shield may be positioned near a tray (e.g., under the table) and have a cross sectional shape that is similar to or slightly larger than a visible or actual periphery of the tray.

A shield 426 may be located between player positions on the table. See FIG. 5. For example, the shield may be formed in the table and/or extend upwardly and/or downwardly therefrom to help isolate adjacent player positions so that when the gaming chips at a particular player position are read, reading of gaming chips at an adjacent player position is avoided or minimized.

In one embodiment, a card reader 428 may be located near each player position, as shown in FIG. 4. Thus, a unique card reader may be positioned near each player position, and/or a card reader may have reading mechanisms near each player position. The card reader may include a slot for accepting a loyalty card (sometimes referred to as a players card, reward card, etc.), credit card, etc.

The card reader in another approach may include a directional antenna 430 (FIG. 8) for reading a wirelessly-readable card when placed on a table at the player position. The communication mode and/or device configuration of the wirelessly-readable card may be as set forth elsewhere herein. In another approach, the card reader may include an antenna that reads a player's card via wireless communication while it is on the player's person. In other approaches, the antenna 404 used to read the gaming chips at a player position may perform double duty and read player cards as well.

The card reader in some embodiments may be coupled to or form part of a system for loyalty tracking. In one approach, a code associated with the player to whom the card is issued is received from the card reader, e.g., upon the player inserting the card in the reader. Assuming the reader is associated with a particular player position, the chips present at, played, won and/or lost at that position can be correlated with the user associated with the card.

In preferred embodiments, the card remains in or near the reader while the player associated with the card is playing. This avoids such things as associating plays, wins and losses with a player that is no longer at the table.

In one embodiment, assuming a player wishes to play more than one position but has only one loyalty card, an extension card may be placed in or near the card reader of the second position that the player is playing. The extension card may be issued with the loyalty card, may be provided to the player by a dealer or pit boss, etc.

An alternate embodiment includes reading a stack of credit cards each having a circuit and a semi-transparent antenna. The credit cards may each further comprise a battery.

A method according to another embodiment includes reading RF devices coupled to photographs in a stack of the photographs, each RF device having a circuit and a semi-transparent antenna coupled thereto.

In any of the embodiments, the gaming chips may be periodically communicated with, e.g., every <1, 1, 5, 10, 30, 60 seconds; may be continuously and/or consecutively communicated with, e.g., the system continuously monitors the gaming chips at a location, singulating and reading some or all of the chips sequentially, potentially over and over again in a loop. Standard (known) and/or specialized communications protocols may be used in various embodiments. Illustrative protocols include RFID protocols, WiFi protocols, etc.

Note also that while a large portion of the disclosure refers to semitransparent gaming chips, it should be kept in mind that the poker chips may include any type of RF circuit and/or antenna including those types known in the art, including antennas that do not allow a significant portion of RF energy to pass therethrough. Moreover, alternate antenna designs may be used, such as antennas located on areas of the gaming chips that result in the antennas being misaligned when viewed in a direction parallel to the stack of chips; antennas that encircle and/or are positioned along a periphery of the gaming chip; etc.

Moreover, while many embodiments have been described using gaming chips, one skilled in the art will appreciate that some embodiments of the present invention may be implemented with other types of items.

For example, one embodiment includes playing cards each having an RF communication device, e.g., circuit and antenna. In one approach, the RF device or portion thereof (e.g., antenna) is semitransparent as disclosed herein, thereby allowing reading of a stack of cards. In another approach, the antennas in each card are offset so that when the cards are stacked, they may be read. In a further approach, a combination of the two antenna technologies are used.

Methods and/or systems similar to those presented elsewhere herein may be used to determine validity of each card; determine what a player's and/or dealer's hand is; determine whether the player has won, lost or pushed based on the dealer's and player's cards; etc.

Figure 9:
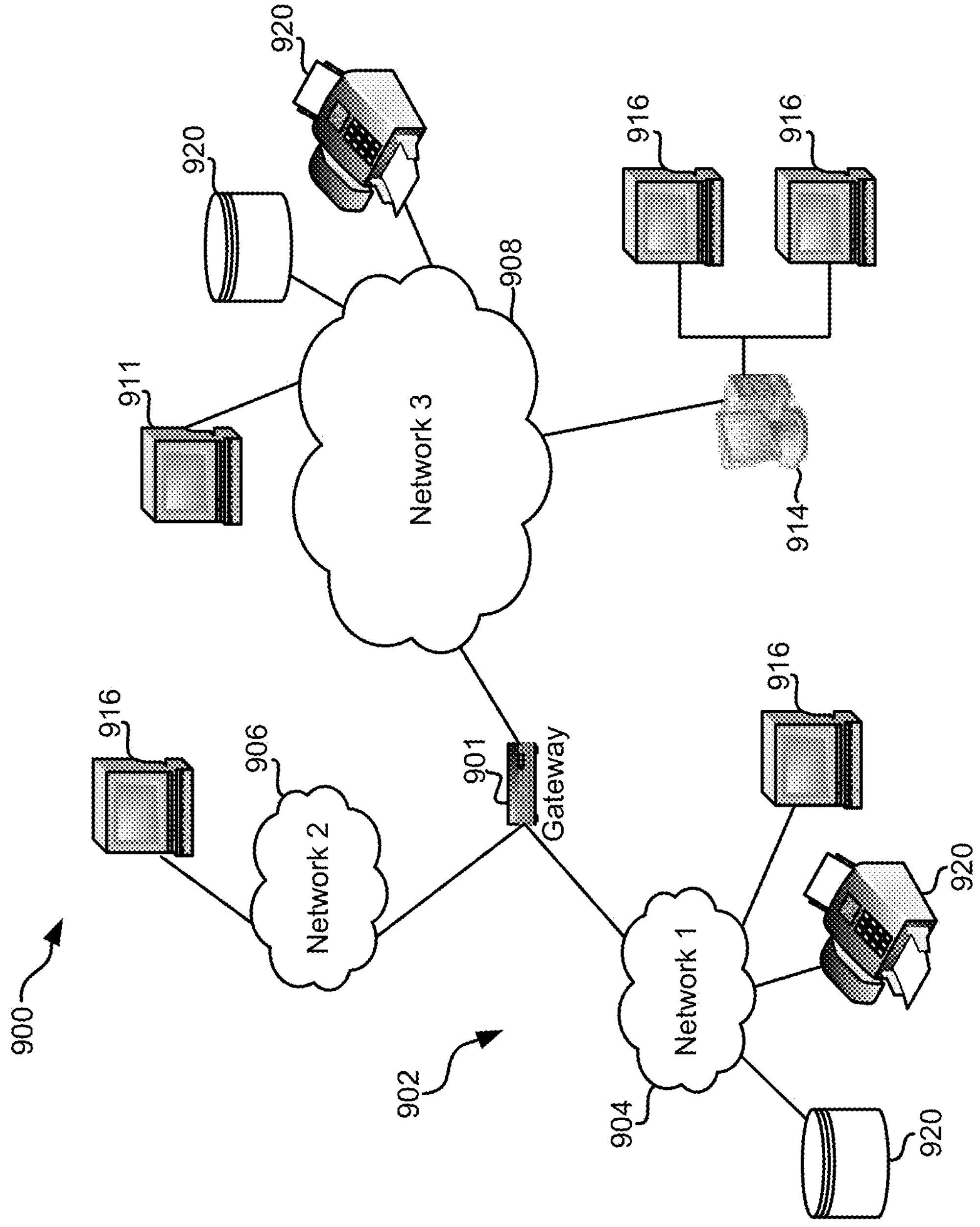
FIG. 9 illustrates a network architecture, in accordance with one embodiment.

FIG. 9 illustrates a network architecture 900, in accordance with one embodiment. As shown in FIG. 9, a plurality of remote networks 902 are provided including a first remote network 904 and a second remote network 906. A gateway 901 may be coupled between the remote networks 902 and a proximate network 908. In the context of the present network architecture 900, the networks 904, 906 may each take any form including, but not limited to a LAN, a WAN such as the Internet, PSTN, internal telephone network, etc.

In use, the gateway 901 serves as an entrance point from the remote networks 902 to the proximate network 908. As such, the gateway 901 may function as a router, which is capable of directing a given packet of data that arrives at the gateway 901, and a switch, which furnishes the actual path in and out of the gateway 901 for a given packet. Further included is at least one data server 914 coupled to the proximate network 908, and which is accessible from the remote networks 902 via the gateway 901. It should be noted that the data server(s) 914 may include any type of computing device/groupware. Coupled to each data server 914 is a plurality of user devices 916. Such user devices 916 may include a desktop computer, laptop computer, hand-held computer, printer or any other type of logic. It should be noted that a user device 911 may also be directly coupled to any of the networks, in one embodiment.

A peripheral 920 or series of peripherals 920, e.g. facsimile machines, printers, networked storage units, etc., may be coupled to one or more of the networks 904, 906, 908. It should be noted that databases, servers, and/or additional components may be utilized with, or integrated into, any type of network element coupled to the networks 904, 906,

908. In the context of the present description, a network element may refer to any component of a network.

Figure 10:
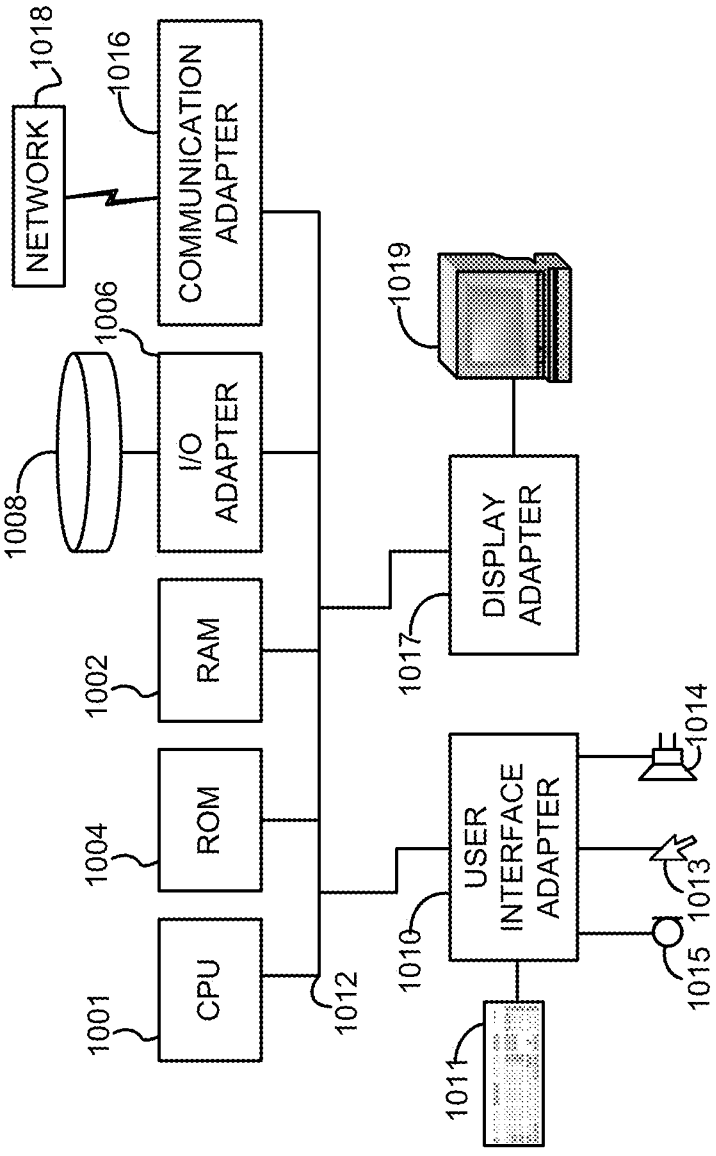
FIG. 10 shows a representative hardware environment that may be associated with the servers and/or clients of FIG. 9, in accordance with one embodiment.

The workstation shown in FIG. 10 includes a central processing unit (CPU) 1001 for performing computations, Random Access Memory (RAM) 1002, Read Only Memory (ROM) 1004, an I/O adapter 1006 for connecting peripheral devices such as magnetic storage units 1008, such as a hard disk drive (HDD), to the bus 1012, a user interface adapter 1010 for connecting a keyboard 1011, a mouse 1013, a speaker 1014, a microphone 1015, and/or other user interface devices such as a touch screen, a digital camera (not shown), etc., to the bus 1012, communication adapter 1016 for connecting the workstation to a communication network 1018 (e.g., a data processing network) and a display adapter 1017 for connecting the bus 1012 to a display device 1019. The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using JAVA, XML, C, and/or C++ language, or other programming languages, along with an object oriented programming methodology. Object oriented programming (OOP), which has become increasingly used to develop complex applications, may be used.

The description herein is presented to enable any person skilled in the art to make and use the invention and is provided in the context of particular applications of the invention and their requirements. Various modifications to the disclosed embodiments will be readily apparent to those skilled in the art and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

In particular, various embodiments of the invention discussed herein are implemented using the Internet as a means of communicating among a plurality of computer systems. One skilled in the art will recognize that the present invention is not limited to the use of the Internet as a communication medium and that alternative methods of the invention may accommodate the use of a private intranet, a Local Area Network (LAN), a Wide Area Network (WAN) or other means of communication. In addition, various combinations of wired, wireless (e.g., radio frequency) and optical communication links may be utilized.

The program environment in which one embodiment of the invention may be executed illustratively incorporates one or more general-purpose computers or special-purpose devices such hand-held computers. Details of such devices (e.g., processor, memory, data storage, input and output devices) are well known and are omitted for the sake of clarity.

It should also be understood that the techniques of the present invention might be implemented using a variety of technologies. For example, the methods described herein may be implemented in software running on a computer system, or implemented in hardware/logic utilizing either a combination of microprocessors or other specially designed application specific integrated circuits, programmable logic devices, or various combinations thereof. In particular, methods described herein may be implemented by a series of computer-executable instructions residing on a storage medium such as a physical computer-readable medium. In addition, although specific embodiments of the invention may employ object-oriented software programming concepts, the invention is not so limited and is easily adapted to employ other forms of directing the operation of a computer.

The invention can also be provided in the form of a computer program product comprising a computer readable medium having computer code thereon. A computer readable medium can include any physical non-transitory medium capable of storing computer code thereon for use by a computer, including optical media such as read only and writeable CD and DVD, magnetic memory such as a hard disk, semiconductor memory (e.g., solid state memory, FLASH memory, portable memory cards, etc.), etc.

Example 1

Gaming chips in a casino each have a passive RF device integrated therein. The reader, present at a blackjack table for instance, sends out an interrogation signal sufficient to read all of the chips at the table (including the players' chips), or at a reduced power to read only those chips in the tray. Upon receiving a response from each tag, the reader or a backend system coupled to the reader can quickly determine the value of the chips on the table and/or in the tray. During active play, this information is useful for historical tracking of the flow of chips in and out of the tray, as well as alerting management to the need to either add chips to the tray or remove chips therefrom. Prior to opening the table or upon closing the table, the chip count in the tray can be quickly and accurately determined by an integrated or portable reader.

Likewise, when a patron wishes to cash out at the cage, the value of a stack of chips can be verified by a reader mounted there and compared against the visual chip count.

This feature would also provide a theft deterrent to dealers who may try to slip chips into their clothing and exit the casino. A reader near the employee exit can be used to detect chips leaving the casino.

Example 2

Currency in a bank is formed into stacks of 50 bills each. Each bill is tagged with a semi-transparent RF device. Several of the stacks are placed in a bag. Prior to passing the bag to the armored car service, the bag is scanned and the value of the currency is recorded electronically and potentially sent to a central server accessible via a network. A paper report can also be provided to the bank and/or armored car service personnel. Upon arrival of the armored car at the Federal Reserve depository, the sealed bag is again scanned and the value is compared to the value it had when it left the bank.

Example 3

Documents, each having a semi-transparent RF device coupled thereto, are stored in a series of rows in a filing room. Someone seeking a particular document passes a portable reader along each row, pair of rows, etc. The reader reads each of the tags in the row(s) within range of the reader. When the reader finds a match, the reader indicates where the document is found, e.g., in row B, section 3.

Example 4

Library books, each having a semi-transparent RF device coupled thereto, are placed in a bin for reshelving. A reader scans the bin and transmits the information to the library server. Books indicated as checked out to patrons have their status automatically updated to indicate the books are available for checkout.

Similarly, during checkout, a patron could set a stack of books on a shelf, where the books are scanned and checked out to the patron. Preferably, the shelf is in a pod or cubicle of shielding material (e.g., metal) that prevents the reader from reading books in adjacent pods.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:

obtaining a first plurality of identifiers associated with a first plurality of gaming chips present at a player position of a gaming table and comprising a wager placed by a player on a game, wherein the first plurality of identifiers are obtained from the first plurality of gaming chips at least in part by RFID technology;

determining a first chip value comprising a value of the first plurality of gaming chips present at the player position;

identifying, after determining the first chip value, an outcome of the game involving the first plurality of gaming chips;

determining a payout value associated with the outcome;

identifying, after determining the outcome, a second plurality of identifiers associated with a second plurality of gaming chips present at the player position after the outcome is determined, wherein the second plurality of identifiers are obtained from the second plurality of gaming chips at least in part by RFID technology;

determining a second chip value comprising a value of the second plurality of gaming chips present at the player position;

determining a change in chip tray value of gaming chips present in a chip tray, the change in chip tray value comprising a change from a first time prior to identifying the outcome to a second time after identifying the outcome; and confirming that the second chip value of the second plurality of gaming chips corresponds to the change in value of gaming chips present in the chip tray, thereby determining that a correct payout has been paid to the player and also that the change in value at the player position is valid.

2. The method of claim 1, further comprising:

storing at least one of the following in a database in association with the game: (i) the first chip value, (ii) the second chip value, and (iii) the change in chip tray value.

3. The method of claim 2, wherein determining the payout value comprises:

determining the second chip value;

determining the change in chip tray value; and confirming that the second chip value equals the change in chip tray value, thereby determining the payout value to be equal to the change in chip tray value and the second gaming chip value.

4. The method of claim 1, wherein the game table is associated with a dealer tip box, the dealer tip box having an RFID antenna corresponding thereto for reading gaming chip identifiers of gaming chips placed into the dealer tip box, the method further comprising:

identifying, using the RFID antenna, a unique identifier of a gaming chip placed into the dealer tip box; and correlating, based on the identifying, the amount of tips earned with a particular dealer known to be dealing at the game table at a time the gaming chip was read.

5. The method of claim 4, wherein the gaming chip placed into the dealer tip box comprises one of the first plurality of gaming chips or the second plurality of gaming chips.

6. The method of claim 5, further comprising:

identifying a unique player identifier of the player, wherein the unique player identifier is obtained using wireless reader technology; and associating each gaming chip of the first plurality of gaming chips and the second plurality of gaming chips with the unique player identifier.

7. The method of claim 6, further comprising:

storing in the memory the unique identifier of the gaming chip placed into the dealer tip box in association with the unique player identifier.

8. A computer program product, the computer program product comprising:

a non-transitory computer readable medium having computer code stored thereon, the computer code comprising:

computer code for obtaining a first plurality of identifiers associated with a first plurality of gaming chips present at a player position of a gaming table and comprising a wager placed by a player on a game, wherein the first plurality of identifiers are obtained from the first plurality of gaming chips at least in part by RFID technology;

computer code for determining a first chip value comprising a value of the first plurality of gaming chips present at the player position;

computer code for identifying, after determining the first chip value, an outcome of the game involving the first plurality of gaming chips;

computer code for determining a payout value associated with the outcome;

computer code for identifying, after determining the outcome, a second plurality of identifiers associated with a second plurality of gaming chips present at the player position after the outcome is determined, wherein the second plurality of identifiers are obtained from the second plurality of gaming chips at least in part by RFID technology;

computer code for determining a second chip value comprising a value of the second plurality of gaming chips present at the player position;

computer code for determining a change in chip tray value of gaming chips present in a chip tray, the change in chip tray value comprising a change from a first time prior to identifying the outcome to a second time after identifying the outcome; and computer code for confirming that the second chip value of the second plurality of gaming chips corresponds to the change in value of gaming chips present in the chip tray, thereby determining that a correct payout has been paid to the player and also that the change in value at the player position is valid.

9. The computer program product of claim 8, the computer code further comprising:

computer code for storing at least one of the following in a database in association with the game: (i) the first chip value, (ii) the second chip value, and (iii) the change in chip tray value.

10. The computer program product of claim 9, wherein the computer code for determining the payout value comprises:

computer code for determining the second chip value;

computer code for determining the change in chip tray value; and computer code for confirming that the second chip value equals the change in chip tray value, thereby determining the payout value to be equal to the change in chip tray value and the second gaming chip value.

11. The computer program product of claim 8, wherein the game table is associated with a dealer tip box, the dealer tip box having an RFID antenna corresponding thereto for reading gaming chip identifiers of gaming chips placed into the dealer tip box, the computer code further comprising:

computer code for identifying, using the RFID antenna, a unique identifier of a gaming chip placed into the dealer tip box; and computer code for correlating, based on the identifying, the amount of tips earned with a particular dealer known to be dealing at the game table at a time the gaming chip was read.

12. The computer program product of claim 11, wherein the gaming chip placed into the dealer tip box comprises one of the first plurality of gaming chips or the second plurality of gaming chips.

13. The computer program product of claim 12, the computer code further comprising:

computer code for identifying a unique player identifier of the player, wherein the unique player identifier is obtained using wireless reader technology; and computer code for associating each gaming chip of the first plurality of gaming chips and the second plurality of gaming chips with the unique player identifier.

14. The computer program product of claim 13, the computer code further comprising:

computer code for storing in the memory the unique identifier of the gaming chip placed into the dealer tip box in association with the unique player identifier.

15. A system, including a hardware processor for performing a method, the method comprising:

obtaining a first plurality of identifiers associated with a first plurality of gaming chips present at a player position of a gaming table and comprising a wager placed by a player on a game, wherein the first plurality of identifiers are obtained from the first plurality of gaming chips at least in part by RFID technology;

determining a first chip value comprising a value of the first plurality of gaming chips present at the player position;

identifying, after determining the first chip value, an outcome of the game involving the first plurality of gaming chips;

determining a payout value associated with the outcome;

identifying, after determining the outcome, a second plurality of identifiers associated with a second plurality of gaming chips present at the player position after the outcome is determined, wherein the second plurality of identifiers are obtained from the second plurality of gaming chips at least in part by RFID technology;

determining a second chip value comprising a value of the second plurality of gaming chips present at the player position;

determining a change in chip tray value of gaming chips present in a chip tray, the change in chip tray value comprising a change from a first time prior to identifying the outcome to a second time after identifying the outcome; and confirming that the second chip value of the second plurality of gaming chips corresponds to the change in value of gaming chips present in the chip tray, thereby determining that a correct payout has been paid to the player and also that the change in value at the player position is valid.

16. The system of claim 15, the method further comprising:

storing at least one of the following in a database in association with the game: (i) the first chip value, (ii) the second chip value, and (iii) the change in chip tray value.

17. The system of claim 16, wherein determining the payout value comprises:

determining the second chip value;

determining the change in chip tray value; and confirming that the second chip value equals the change in chip tray value, thereby determining the payout value to be equal to the change in chip tray value and the second gaming chip value.

18. The system of claim 15, wherein the game table is associated with a dealer tip box, the dealer tip box having an RFID antenna corresponding thereto for reading gaming chip identifiers of gaming chips placed into the dealer tip box, the method further comprising:

identifying, using the RFID antenna, a unique identifier of a gaming chip placed into the dealer tip box; and correlating, based on the identifying, the amount of tips earned with a particular dealer known to be dealing at the game table at a time the gaming chip was read.

19. The system of claim 18, wherein the gaming chip placed into the dealer tip box comprises one of the first plurality of gaming chips or the second plurality of gaming chips.

20. The system of claim 19, the method further comprising:

identifying a unique player identifier of the player, wherein the unique player identifier is obtained using wireless reader technology; and associating each gaming chip of the first plurality of gaming chips and the second plurality of gaming chips with the unique player identifier.

21. The system of claim 20, the method further comprising:

storing in the memory the unique identifier of the gaming chip placed into the dealer tip box in association with the unique player identifier.

* * * * *